(12) United States Patent
Reitz

(10) Patent No.: US 9,216,729 B2
(45) Date of Patent: Dec. 22, 2015

(54) HYBRID MODULE AND TORQUE TRANSFER DEVICE

(71) Applicant: Schaeffler Technologies AG & Co. KG, Herzogenaurach (DE)

(72) Inventor: Dierk Reitz, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 306 days.

(21) Appl. No.: 13/722,475

(22) Filed: Dec. 20, 2012

(65) Prior Publication Data

US 2013/0165294 A1 Jun. 27, 2013

(30) Foreign Application Priority Data

Dec. 23, 2011 (DE) .......................... 10 2011 089 742

(51) Int. Cl.
*B60W 20/00* (2006.01)
*B60K 6/48* (2007.10)
*F16H 57/025* (2012.01)
*F16H 41/24* (2006.01)
*F16H 57/02* (2012.01)

(52) U.S. Cl.
CPC ............... *B60W 20/00* (2013.01); *B60K 6/48* (2013.01); *F16H 57/025* (2013.01); *B60Y 2304/076* (2013.01); *B60Y 2400/426* (2013.01); *F16H 41/24* (2013.01); *F16H 2057/02034* (2013.01); *Y02T 10/6221* (2013.01); *Y10T 477/26* (2015.01)

(58) Field of Classification Search
USPC .......... 192/70.13, 70.16, 109 R, 110 R, 110 S
See application file for complete search history.

(56) References Cited

U.S. PATENT DOCUMENTS

| 6,258,001 | B1 * | 7/2001 | Wakuta et al. ................... 475/5 |
| 8,479,906 | B2 * | 7/2013 | Hauck ......................... 192/70.16 |
| 2010/0038201 | A1 * | 2/2010 | Mueller et al. ............... 192/3.29 |
| 2010/0062899 | A1 * | 3/2010 | Engelmann et al. ............ 477/86 |
| 2010/0105518 | A1 * | 4/2010 | Kasuya et al. ................... 477/5 |
| 2011/0240431 | A1 * | 10/2011 | Iwase et al. ................. 192/3.29 |
| 2012/0318630 | A1 * | 12/2012 | Iwase et al. ............... 192/85.01 |

* cited by examiner

*Primary Examiner* — Jacob S Scott
(74) *Attorney, Agent, or Firm* — Simpson & Simpson, PLLC

(57) ABSTRACT

The present invention relates to a hybrid module with fastening means for fastening, for example, detachable fastening, of the hybrid module with a torque transfer device, such as a torque converter or a clutch, such as a dual clutch, where the hybrid module includes a drive shaft that can be connected to an internal combustion engine and can rotate around a rotary axis and an electric motor with a stator, a rotor, and a power take-off component that can be connected to the rotor and where the torque transfer device has a transfer component for connecting to the hybrid module, where the fastening means axially secure the power take-off component with respect to the transfer component and can produce the connection between fastening means and transfer component.

16 Claims, 6 Drawing Sheets

HYBRID MODULE AND TORQUE TRANSFER DEVICE

CROSS-REFERENCE TO RELATED APPLICATION

This patent application claims priority from German Patent Application No. 10 2011 089 742.9, filed Dec. 23, 2011, which application is incorporated herein by reference in its entirety.

FIELD OF THE INVENTION

The invention relates to a hybrid module and also to a torque transfer device to be fastened on such a module.

BACKGROUND OF THE INVENTION

Such hybrid modules are generally known. In them, the fastening of the hybrid module to the torque transfer device is realized with the use of fastening means that can usually be manipulated radially from the outside using a fastening tool. Radial access to the fastening location, e.g., through a housing opening, is necessary for this.

BRIEF SUMMARY OF THE INVENTION

The object of the present invention is to improve the assembly of a hybrid module with a torque transfer device.

Thus, a hybrid module is suggested that has a fastening means for fastening the hybrid module, for example detachably, to a torque transfer device, where the hybrid module includes a drive shaft that can be connected to an internal combustion engine and a can rotate around a rotary axis and an electric motor with a stator and a rotor and a power take-off component that can be connected to the rotor, and where the torque transfer device has a transfer component for connection with the hybrid module. In this way, the fastening means implements an axial securing of the power take-off component with respect to the transfer component and can be guided through a central hole in the drive shaft, where a simplified assembly of the hybrid module with the torque transfer device can be realized. Moreover, a more reliable structure of the hybrid module or surrounding or adjacent components can be realized by the elimination of an access opening for passing through the fastening tool for the fastening means. Also, the axial construction space of the complete structure can be reduced.

In a design of the invention, the fastening means are screwed onto the transfer component, e.g., using a fine thread. Also, this can be screwed on a curved path by only a specific angle, for example 90°, to create an attachment with the transmission components (similar to a classic bayonet catch).

In a design of the invention, one section of the fastening means is at a distance radially from the rotary axis that is smaller than or equal to the smallest radial extension of the central hole of the drive shaft from the rotary axis, in a limited axial section between the fastening means and an initial section of the drive shaft turned away from the torque transfer device. The radial distance from the fastening means section to the rotary axis can also be zero.

In another embodiment of the invention, the power take-off component is connected to the transfer component by way of a cone connection and/or gearing. For example, the gearing is designed as radial or axial gearing.

In another design of the invention, the rotor is mounted radially inside the stator.

In another embodiment of the invention, the power take-off component has a flange section and, in a radial inner area, a power take-off socket with a section that extends essentially axially. For example, the section that extends axially extends from the flange section, in the axial direction pointing away from the torque transfer device.

In another embodiment of the invention, the transfer component engages in the power-take-off socket. For example, the transfer component has a transfer socket that engages in the power take-off socket, at least in sections. In this process, the power take-off socket and the transfer socket each have a center hole for holding the fastening means.

In another design of the invention, the fastening means overlap the power take-off socket in sections on the side turned away from the transfer component to axially secure the power take-off component with respect to the transfer component.

In another design of the invention, the power take-off socket has a radial projection that is arranged axially in sections between the fastening means and the transfer component.

In an embodiment of the invention, the drive shaft has a socket-like section, on which a bearing can be mounted. For example, the socket-like section overlaps the power take-off component and/or the power take-off socket axially in sections.

In addition, a torque transfer device is suggested, for example, a torque converter, CVT, wet-running or dry dual clutch, for fastening on a hybrid module with one of the preceding characteristics.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
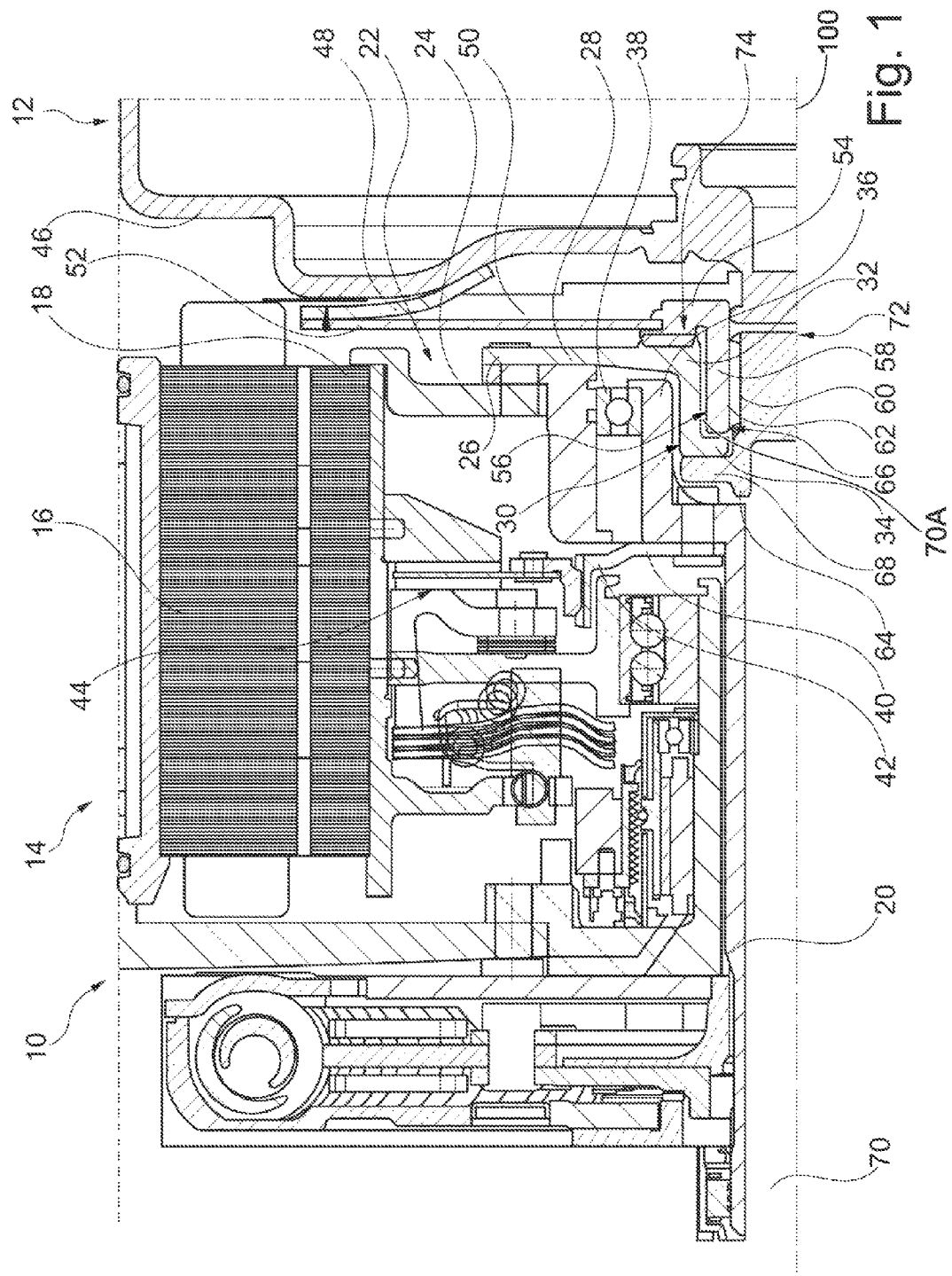
FIG. 1 is a half cross section of a hybrid module and a torque transfer device in an embodiment of the invention.

FIG. 1 shows a half cross section of hybrid module 10 and torque transfer device 12 in an embodiment of the invention. Hybrid module 10 includes electric motor 14 with stator 16 that is fixed against rotation with respect to rotary axis 100 and rotor 18 that can rotate around rotary axis 100, where rotor 18 and stator 16 can be coupled together with active electrodynamic force. Rotor 18 can be coupled with drive shaft 20 in a rotationally fixed manner, where drive shaft 20 is connected to an output of a drive unit, especially of a combustion engine.

Also connected to rotor 18 is power take-off component 22 that includes first power take-off component 24 that is connected directly to rotor 18 and second power take-off component 26 that is rotationally fixed to it. Second power take-off component 26 has flange section 28 that extends essentially radially, on which power take-off socket 30 is connected in a radially inner area that is formed as a unit with it. Power take-off socket 30 has section 32 that extends essentially axially, which extends from flange section 28 in the axial direction pointing away from torque transfer device 12. On one axial end of power take-off socket 30, radial projection 34 is formed as a unit with it, which extends from axially extending section 32 radially in the direction of rotary axis 100.

In sections, power take-off socket 30 is surrounded by socket-like section 36 of drive shaft 20, where socket-like section 36 makes it possible to hold bearing 38 that is mounted and active between drive shaft 20 and power take-off component 22. In section 40, that essentially runs radially and connects socket-like section 36 of drive shaft 20 with the remaining part of drive shaft 20, drive shaft 20 is rotationally fixed to inner disc carrier 42 of friction clutch 44.

Torque transfer device 12 in the form of a torque converter is mounted axially adjacent to hybrid module 10. Torque transfer device 12 has converter housing 46 for holding an impeller and turbine wheel, possibly of a converter lock up clutch, of a centrifugal pendulum-type absorber or of a torsional vibration damper. On converter housing 46, driving plate 48 is fastened, for example using a welding process. Driving plate 48 extends radially out from converter housing 46 and is tightly connected to transfer component 50 in a radially outer area with the use of a welded connection.

Transfer component 50 is formed by flex plate 52 that extends essentially radially and can bend to a limited extent, which compensates relative axial motions between torque transfer device 12 and hybrid module 10. Moreover, transfer component 50 includes transfer element 54 that is connected so that it rotates with flex plate 52 and is mounted radially inside flex plate 52. On transfer element 54, transfer socket 56 is mounted that has section 58 that runs essentially axially and extends in the direction of drive shaft 20. This transfer socket 56 engages in sections in power take-off socket 30 and is mounted radially inside it.

On an inner circumference of transfer socket 56, inner thread 60 is formed in such a way that complementary outer thread 62 of fastening means 64 can be inserted and can produce an interlocking connection between fastening means 64 and transfer socket 56.

On one axial end area 66 of transfer socket 56, there is an axially adjacent, either directly or indirectly, radial extension 34 of power take-off socket 30 in order to make it possible to axially secure power take-off socket 30 with respect to transfer socket 56 in axial direction. The axial securing in the opposite axial direction is made possible by fastening means 64, for example in the form of a screw, screw head 68 of which is connected to radial extension 34 of power take-off socket 30, and thus, can enable an axial securing and fastening of power take-off component 22 with transfer component 50.

In an embodiment, fastening means 64 can be introduced through portion 70A of central hole 70 formed in drive shaft 20 and can be slid between one axial end of drive shaft 20 and opposite axial section of drive shaft 20 until it finally comes in contact with radial extension 34 of power take-off socket 30 and is fastened by an interlocking connection to transfer component 50 using outer thread 62 on fastening means 64 and inner thread 60 on transfer component 50. To do this, there is section 72 on fastening means 64, the radial distance of which from rotary axis 100 is less than or equal to the smallest extension of central hole 70 from rotary axis 100.

Figure 2:
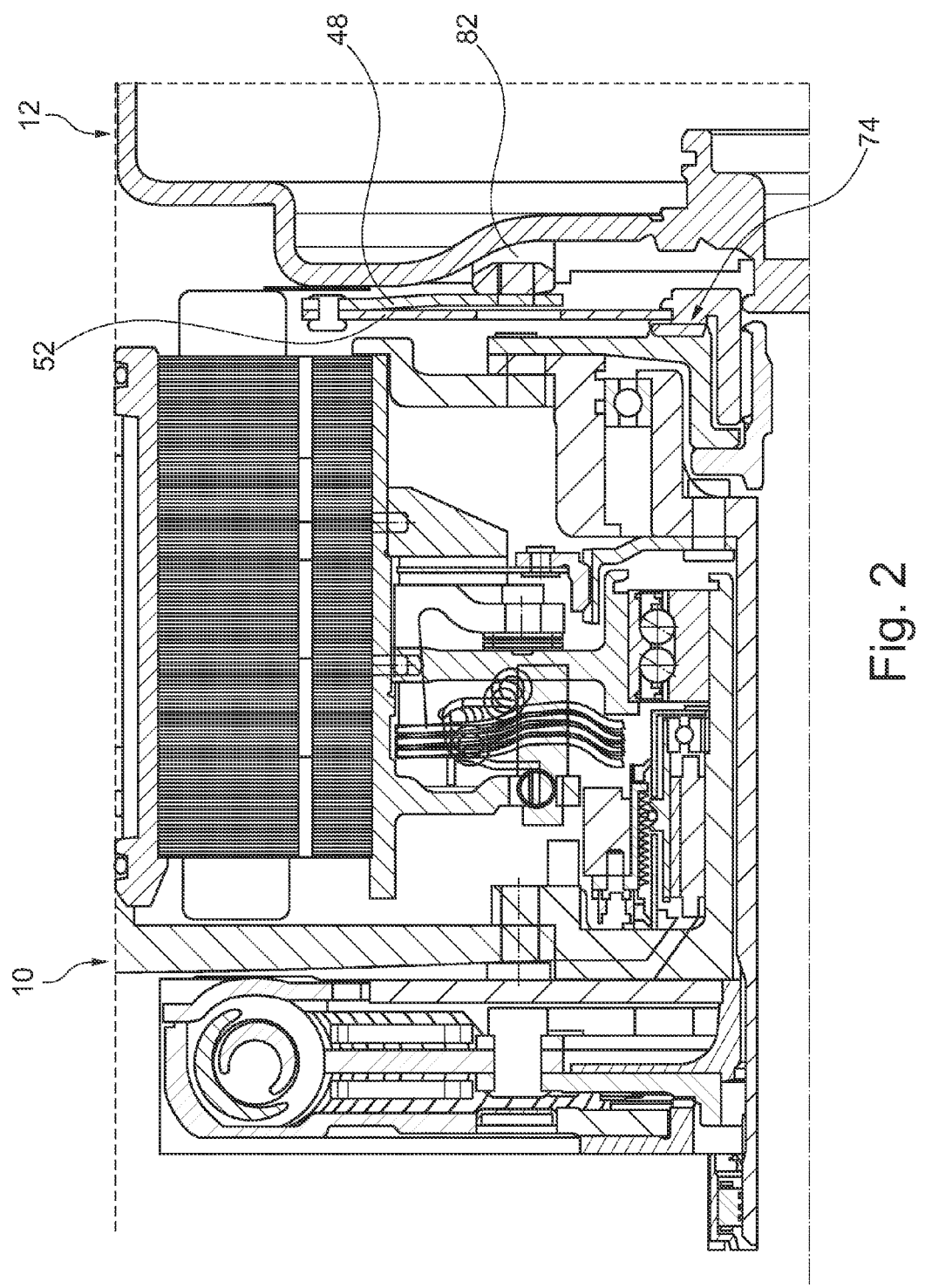
FIG. 2 is a half cross section of a hybrid module and a torque transfer device in another embodiment of the invention.
Figure 3:
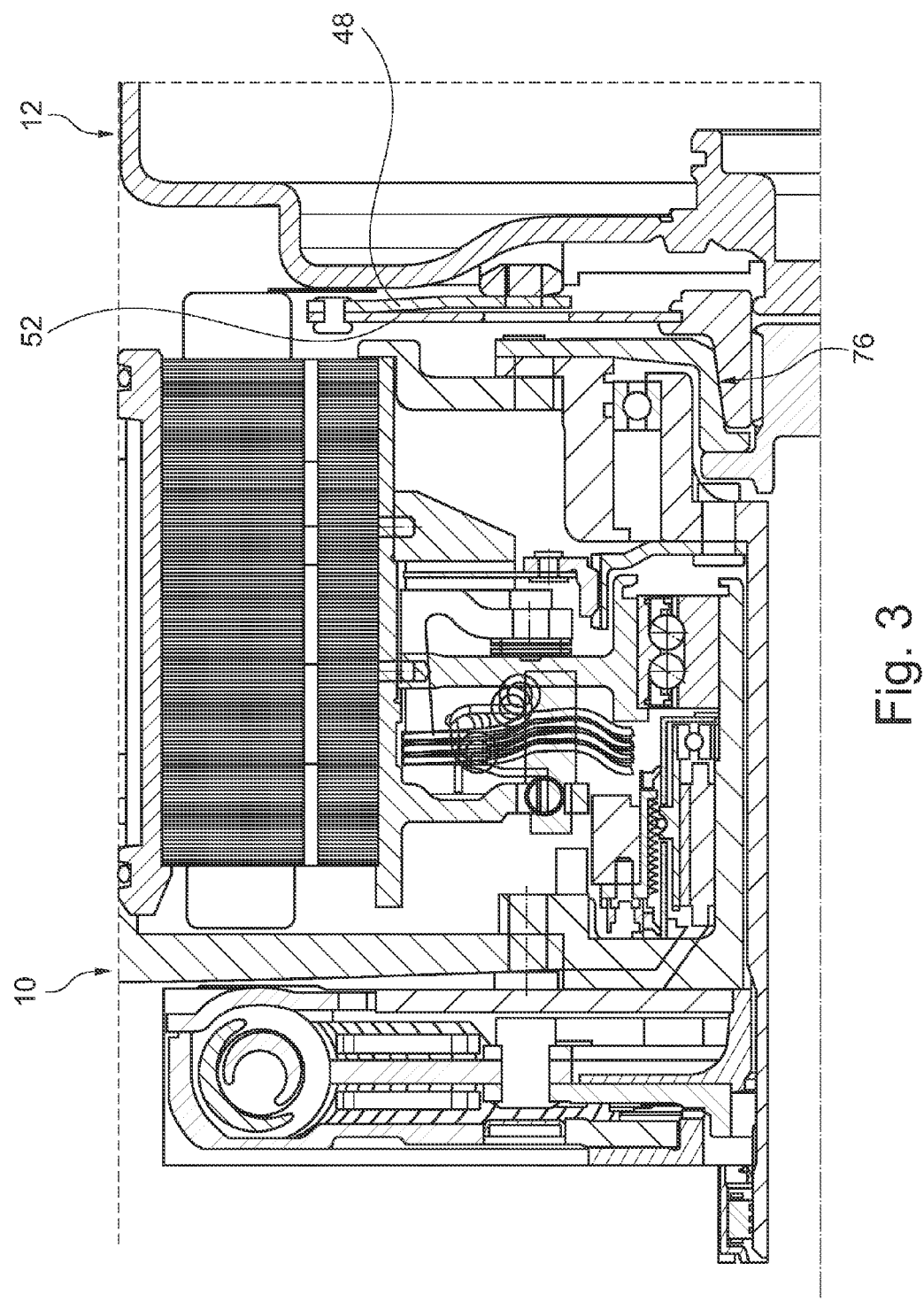
FIG. 3 is a half cross section of a hybrid module and a torque transfer device in another embodiment of the invention.
Figure 4:
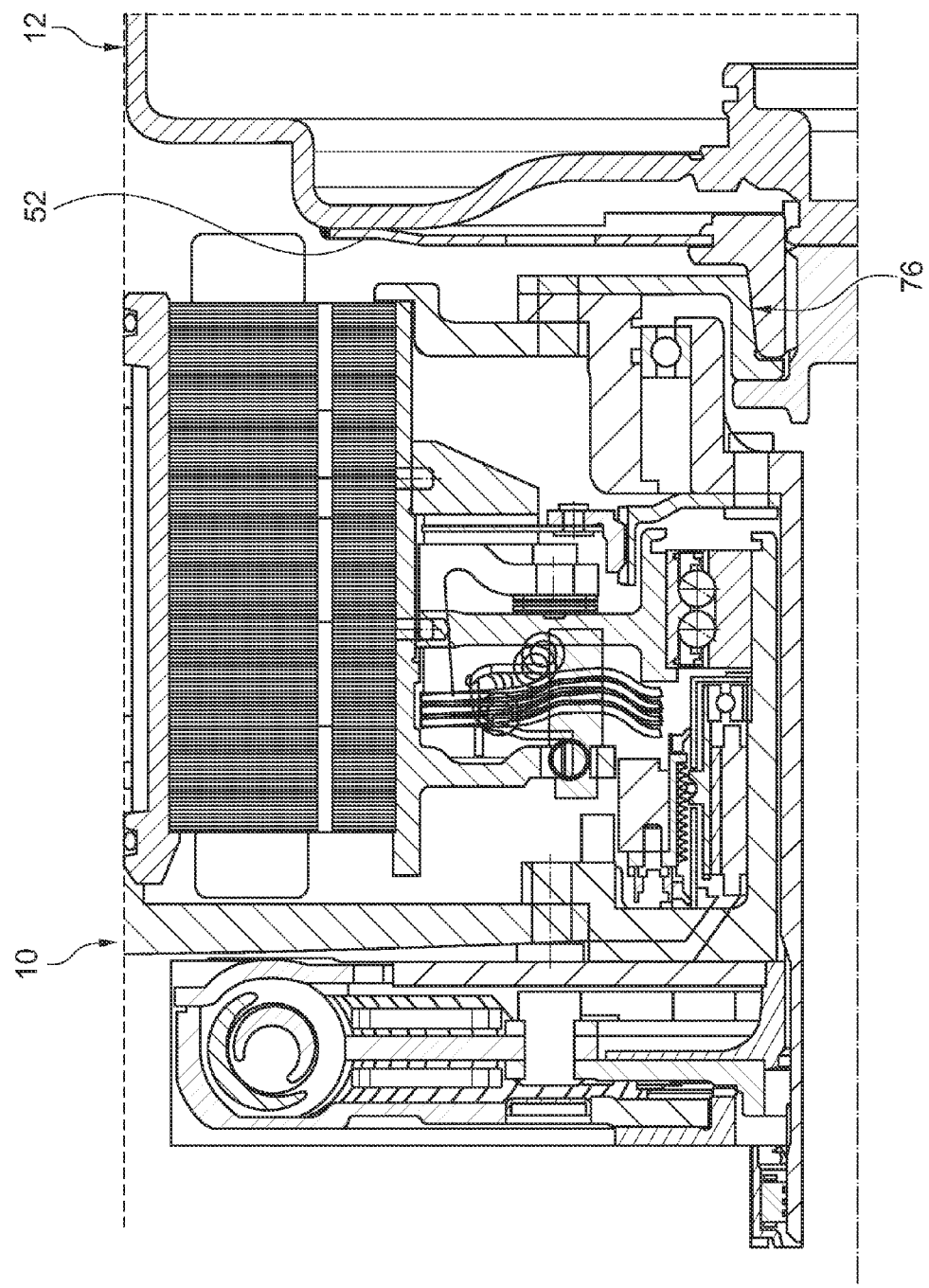
FIG. 4 is a half cross section of a hybrid module and a torque transfer device in another embodiment of the invention.
Figure 5:
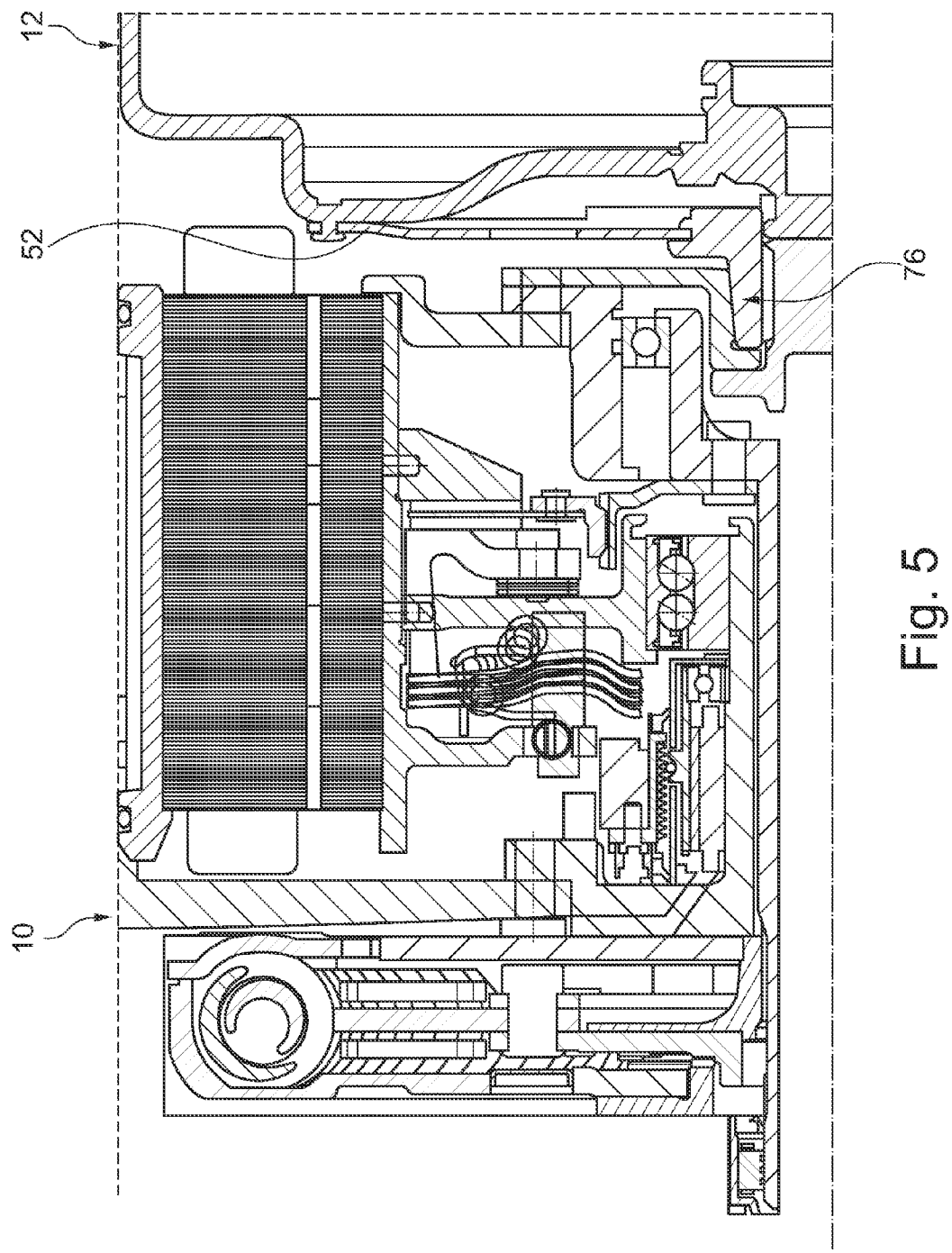
FIG. 5 is a half cross section of a hybrid module and a torque transfer device in another embodiment of the invention; and, FIG. 6 is a half cross section of a hybrid module and a torque transfer device in another embodiment of the invention.
Figure 6:
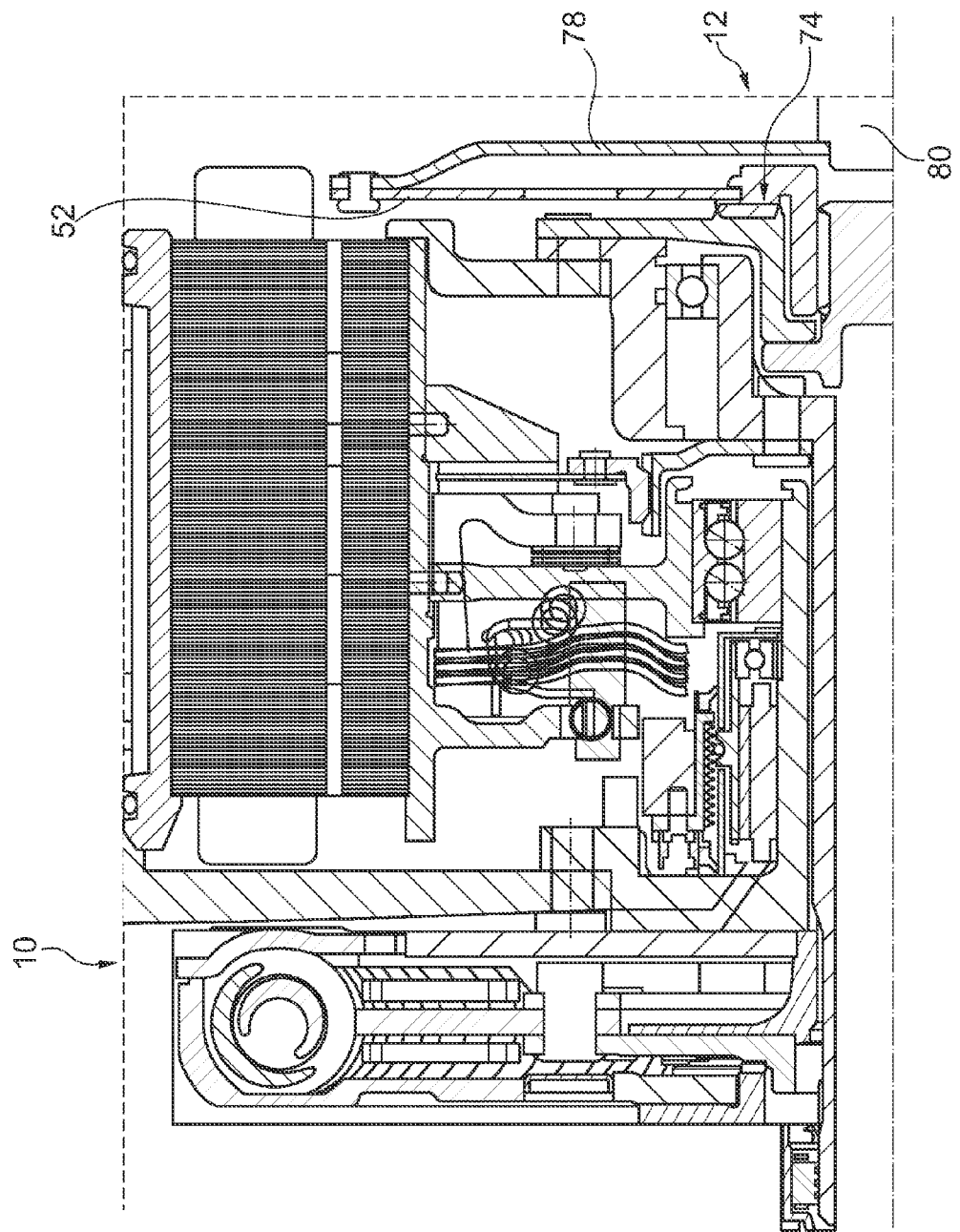

The rotationally fixed connection between power take-off component 22 and transfer component 50 can be implemented with different alternatives. To do this, FIGS. 1 through 6 show different possibilities for a detachable, but rotationally-fixed, connection between power take-off component 22 and transfer component 50. FIGS. 1, 2, and 6 show the rotationally-fixed connection using axial gearing 74, especially a Hirth serration, while FIGS. 3, 4, and 5 show the possibility of a rotationally-fixed connection using chuck cone connection 76. To do this, a radially outer circumference section of transfer section 56 is designed so it tapers to a cone in the direction of torque transfer device 12. The inner circumference of transfer section 56 is also designed so that it tapers to a complementary cone.

In addition, FIGS. 1 through 5 show various design options for transfer component 50 and driving plate 48 and various methods for fastening transfer component 50 to torque transfer device 12 and/or driving plate 48. To do this, in FIG. 2 and analogously in FIG. 3, driving plate 48 is screwed to converter housing 46, and for this, purpose ribs 82 are formed on converter housing 46 for screwing. In turn, driving plate 48 is fastened to transfer component 50, especially to flex plate 52, with the use of a riveted connection.

FIG. 4, and analogously FIG. 5, show transfer component 50 that is fastened directly to converter housing 46, either with the use of a welded connection as shown in FIG. 4, or using a riveted connection as shown in FIG. 5.

In FIG. 6, torque transfer device 12 is designed as a clutch device, for example as a dual clutch. For this purpose, driving flange 78 is rotationally fixed with transfer component 50 with the use of a riveted connection. In turn, drive flange 78 is rotationally fixed with drive hub 80 of the clutch device in a radially inner area.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMBERS

10 Hybrid module
12 Torque transfer device
14 Electric motor
16 Stator
18 Rotor
20 Drive shaft
22 Power take-off component
24 Power take-off component
26 Power take-off component
28 Flange section
30 Power take-off socket
32 Section
34 Radial extension
36 Socket-like section
38 Bearing
40 Section
42 Inner disc carrier
44 Friction clutch
46 Converter housing
48 Driving plate
50 Transfer component
52 Flex plate
54 Transfer element
56 Transfer socket
58 Section
60 Inner thread
62 Outer thread
64 Fastening means
66 End area
68 Screw head
70 Central hole
72 Section
74 Axial gearing
76 Chuck cone connection
78 Driving flange
80 Drive hub
82 Ribs
100 Rotary axis

What is claimed is:

1. A hybrid module, comprising:
a drive shaft that can be connected to an internal combustion engine and can rotate around a rotary axis;
an electric motor having a stator and a rotor;
a power take-off component that can be connected to the rotor; and,
a fastening means arranged to axially secure the power take-off component with respect to a transfer component for a torque transfer device, wherein:
the drive shaft has a socket-like section, on which a bearing can be mounted; and,
the socket-like section overlaps the power take-off component axially in sections.

2. The hybrid module as recited in claim 1, wherein the fastening means is screwed together with the transfer component.

3. The hybrid module as recited in claim 1, wherein a section of the fastening means is at a radial distance from the rotary axis, which is smaller than or equal to a smallest radial extension of a central hole of the drive shaft from the rotary axis.

4. The hybrid module as recited in claim 1, wherein the power take-off component is connected to the transfer component by way of a cone connection or gearing.

5. The hybrid module as recited in claim 1, wherein the rotor is mounted radially inward of the stator.

6. The hybrid module as recited in claim 1, wherein the power take-off component has a flange section and in a radially inner area has a power take-off socket with a section that extends axially.

7. The hybrid module as recited in claim 6, wherein the axially extending section of the flange section extends in an axial direction away from the torque transfer device.

8. The hybrid module as recited in claim 6, wherein the transfer component engages in the power take-off socket.

9. The hybrid module as recited in claim 8, wherein the transfer component has a transfer socket, which engages in the power take-off socket, at least in sections.

10. The hybrid module as recited in claim 9, wherein the power take-off socket and the transfer socket each have a respective central hole for holding the fastening means.

11. The hybrid module as recited in claim 6, wherein the fastening means overlaps the power take-off socket in sections radially on a side turned away from the transfer component.

12. The hybrid module as recited in claim 6, wherein the power take-off socket has a radial projection that is arranged axially in sections between the fastening means and the transfer component.

13. The torque transfer device as recited in claim 1, wherein the torque transfer device is a torque converter, or a continuously variable transmission (CVT), or a wet-running dual clutch, or a dry dual clutch.

14. A hybrid module, comprising:
an axis of rotation;
a cover for a torque converter;
a drive shaft that can be connected to an internal combustion engine;
an electric motor having a stator and a rotor;
a power take-off component connected to the rotor;
a transfer component:
 connected to the cover; and,
 with a rotationally fixed connection to the power take-off component;
a fastening means:
 with an interlocking connection to the transfer component; and,
 axially securing the transfer component; and,
an axial gear:
 having a rotational fixed connection with the power-take off component and the transfer component; and,
 located between the power-take off component and transfer component in an axial direction parallel to the axis of rotation.

15. A hybrid module, comprising:
an axis of rotation;
a cover for a torque converter;
a drive shaft that can be connected to an internal combustion engine;
an electric motor having a stator and a rotor;
a power take-off component connected to the rotor;
a transfer component:
 connected to the cover; and,
 with a rotationally fixed connection to the power take-off component;
a fastening means:
 with an interlocking connection to the transfer component; and,
 axially securing the transfer component; and,
an axial gear:
 having a rotational fixed connection with the power-take off component and the transfer component; and, located between the power-take off component and transfer component in an axial direction parallel to the axis of rotation, wherein a portion of the transfer component is located between the axial gear and the fastening means in a radial direction orthogonal to the axis of rotation.

16. The hybrid module of claim 15, wherein at least a portion of the axial gear is located further from the axis of rotation, in the radial direction, than the fastening means.

\* \* \* \* \*